United States Patent
Radzinski

(10) Patent No.: US 7,532,129 B2
(45) Date of Patent: May 12, 2009

(54) APPARATUS AND METHODS FOR CONVEYING AND OPERATING ANALYTICAL INSTRUMENTATION WITHIN A WELL BOREHOLE

(75) Inventor: Paul Radzinski, Houston, TX (US)

(73) Assignee: Weatherford Canada Partnership, Houston, TX (US)

( * ) Notice: Subject to any disclaimer, the term of this patent is extended or adjusted under 35 U.S.C. 154(b) by 511 days.

(21) Appl. No.: 11/224,490

(22) Filed: Sep. 12, 2005

(65) Prior Publication Data

US 2006/0087449 A1    Apr. 27, 2006

Related U.S. Application Data

(60) Provisional application No. 60/614,320, filed on Sep. 29, 2004.

(51) Int. Cl.
*G01V 3/00* (2006.01)
(52) U.S. Cl. .............. 340/853.1; 702/6; 175/45
(58) Field of Classification Search .............. 340/853.1; 702/6, 11, 16; 175/45
See application file for complete search history.

(56) References Cited

U.S. PATENT DOCUMENTS

| | | | |
|---|---|---|---|
| 3,748,573 A * | 7/1973 | Vogel ........................ | 324/369 |
| 3,780,302 A | 12/1973 | Arnold et al. | |
| 4,002,904 A | 1/1977 | Smith, Jr. et al. | |
| 4,424,444 A | 1/1984 | Smith, Jr. et al. | |
| 4,461,088 A | 7/1984 | Van Steenwyk | |
| 4,529,939 A * | 7/1985 | Kuckes ........................ | 324/346 |
| 4,690,214 A | 9/1987 | Wittrisch | |
| 4,715,446 A * | 12/1987 | Wittrisch ..................... | 166/381 |
| 6,229,453 B1 * | 5/2001 | Gardner et al. ........... | 340/853.8 |
| 6,885,942 B2 * | 4/2005 | Shray et al. .................... | 702/6 |
| 2005/0667169 | 3/2005 | Willis | |
| 2006/0116823 A1 * | 6/2006 | Griffiths ........................ | 702/6 |

FOREIGN PATENT DOCUMENTS

WO    WO 2004/090287 A1    10/2004

OTHER PUBLICATIONS

UK Search Report GB0519342.0 dated Feb. 10, 2006.

* cited by examiner

*Primary Examiner*—Timothy Edwards, Jr.
(74) *Attorney, Agent, or Firm*—Wong, Cabello, Lutsch, Rutherford & Brucculeri, LLP

(57) ABSTRACT

A borehole conveyance system that integrates wireline type downhole instrumentation into the drill string tripping operations that are typically performed in a borehole drilling operation to increase the types of measurements that can be obtained during the drilling operation and reduce equipment costs and maintenance costs. Certain wireline type tools can be used during drilling operations to yield measurements superior to their LWD/MWD counterparts, but not during any drilling operation in which the drill string is rotating while other types of wireline tools can be used to obtain measurements not possible with LWD/MWD systems.

11 Claims, 3 Drawing Sheets

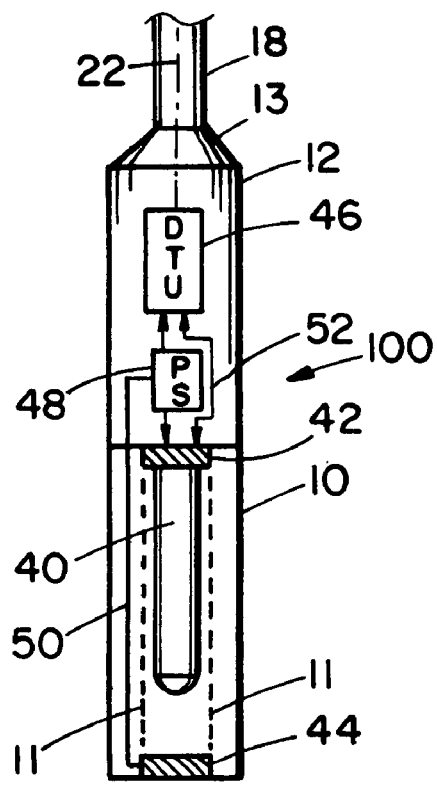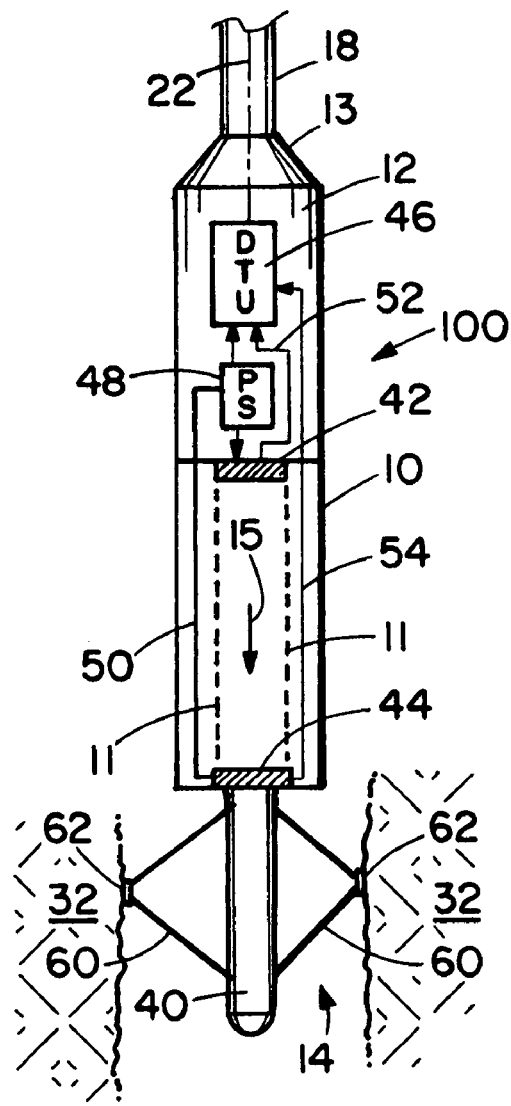
Fig. 2a
Fig. 2b

APPARATUS AND METHODS FOR CONVEYING AND OPERATING ANALYTICAL INSTRUMENTATION WITHIN A WELL BOREHOLE

CROSS-REFERENCE TO RELATED APPLICATIONS

This application claims the benefit of U.S. provisional application No. 60/614,320 filed Sep. 29, 2004.

BACKGROUND OF THE INVENTION

1. Field of the Invention

This invention is directed toward apparatus and methods for conveying and operating analytical instrumentation within a well borehole. More specifically, the invention is directed toward measurements of borehole conditions and parameters of earth formation penetrated by the borehole using a tubular to convey the required analytical instrumentation.

2. Background of the Art

Properties of borehole environs are of great importance in hydrocarbon production. These properties include parameters related to the borehole, parameters related to properties of formations penetrated by the borehole, and parameters associated with the drilling and the subsequent production from the borehole. Borehole parameters include temperature and pressure, borehole wall imaging, caliper, orientation and the like. Formation properties include density, porosity, acoustic velocity, resistivity, formation fluid type, formation imaging, pressure and permeability. Parameters associated with drilling include weight on bit, borehole inclination, borehole direction and the like.

Properties of borehole environs are typically obtained using two broad types or classes of geophysical technology. The first class is typically referred to as wireline technology, and the second class is typically referred to as "measurement-while-drilling" (MWD) or "logging-while-drilling" (LWD).

Using wireline technology, a downhole instrument comprising one or more sensors is conveyed along the borehole by means of a cable or "wireline" after the well has been drilled. The downhole instrument typically communicates with surface instrumentation via the wireline. Borehole and formation measurements are typically obtained in real time at the surface of the earth. These measurements are typically recorded as a function of depth within the borehole thereby forming a "log" of the measurements. Basic wireline technology has been expanded to other embodiments. As an example, the downhole instrument can be conveyed by a tubular such as coiled production tubing. As another example, downhole instrument is conveyed by a "slick line" which does not serve as a data and power conduit to the surface. As yet another example, the downhole instrument is conveyed by the circulating mud within the borehole. In embodiments in which the conveyance means does not also serve as a data conduit with the surface, measurements and corresponding depths are recorded within the tool, and subsequently retrieved at the surface to generate the desired log. These are commonly referred to as "memory" tools. All of the above embodiments of wireline technology share a common limitation in that they are used after the borehole has been drilled.

Using MWD or LWD technology, measurements of interest are typically made while the borehole is being drilled, or at least made during the drilling operation when the drill string is periodically removed or "tripped" to replace worn drill bits, wipe the borehole, set intermediate strings of casing, and the like.

Both wireline and LWD/MWD technologies offer advantages and disadvantages which generally known in the art, and will mentioned only in the most general terms in this disclosure for purposed of brevity. Certain wireline measurements produce more accurate and precise measurements than their LWD/MWD counterparts. As an example, dipole shear acoustic logs are more suitable for wireline operation than for the acoustically "noisy" drilling operation. Certain LWD/MWD measurements yield more accurate and precise measurements than their wireline counterparts since they are made while the borehole is being drilled and before drilling fluid invades the penetrated formation in the immediate vicinity of the well borehole. As examples, certain types of shallow reading nuclear logs are often more suitable for LWD/MWD operation than for wireline operation. Certain wireline measurements employ articulating pads which directly contact the formation and which are deployed by arms extending from the main body of the wireline tool. Examples include certain types of borehole imaging and formation testing tools. Pad type measurements are not conceptually possible using LWD/MWD systems, since LWD/MWD measurements are typically made while the measuring instrument is being rotating by the drill string. Stated another way, the pads and extension arms would be quickly sheared off by the rotating action of the drill string.

SUMMARY OF THE INVENTION

The present invention is a borehole conveyance system that integrates wireline type downhole instrumentation into the drill string tripping operations that are typically performed in a borehole drilling operation. This increases the types of measurements that can be obtained during the drilling operation. Equipment costs and maintenance costs are often reduced. Certain wireline type tools can be used during drilling operations to yield measurements superior to their LWD/MWD counterparts, but not during any drilling operation in which the drill string is rotating. Other types of wireline tools can be used to obtain measurements not possible with LWD/MWD systems.

BRIEF DESCRIPTION OF THE DRAWINGS

So that the manner in which the above recited features, advantages and objects of the present invention are obtained and can be understood in detail, more particular description of the invention, briefly summarized above, may be had by reference to the embodiments thereof which are illustrated in the appended drawings.

FIG. 2a shows the borehole conveyance system with the wireline tool contained within;

FIG. 2b shows the borehole conveyance system with the wireline tool attached thereto and deployed in the borehole;

DESCRIPTION OF THE PREFERRED EMBODIMENTS

Figure 1:
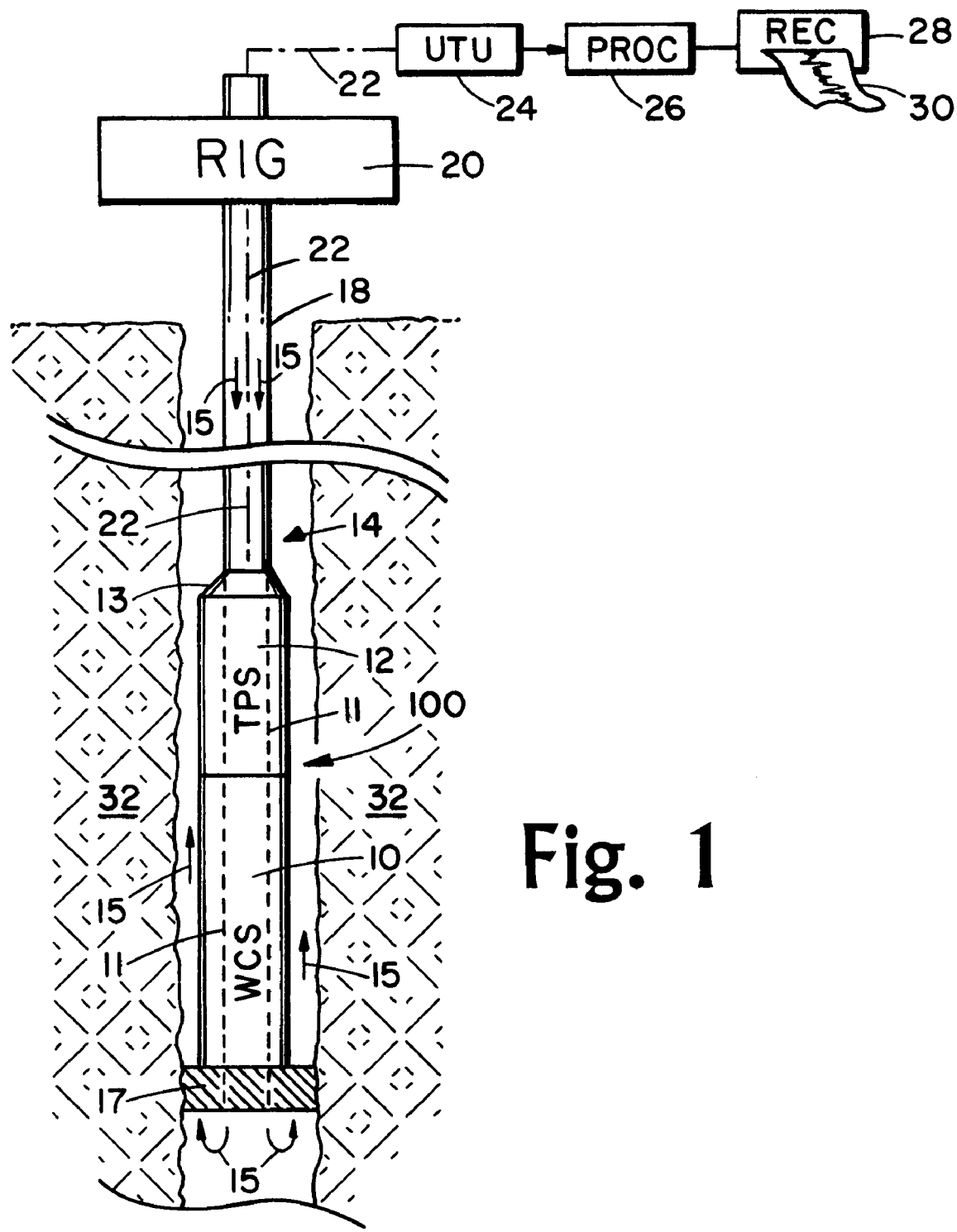
FIG. 1 illustrates a borehole conveyance system for a wireline tool, with the conveyance system deployed using a drill string in a borehole environment.

FIG. 1 illustrates a borehole conveyance system 100 that is used to integrate wireline type downhole instrumentation into the tripping operations used periodically during a well borehole drilling operation. A wireline tool conveyance subsection 10 (wireline conveyance sub "WCS") is operationally attached to a telemetry-power subsection 12 ("telemetry-power sub "TPS") and suspended within a borehole 14 by means of a drill string 18 through a connector head 13. The borehole 14 penetrates earth formation 32. The lower end of WCS 10 is optionally connected to a wiper 17. The upper end of the drill string 18 is terminated at a rotary drilling rig 20, which is known in the art and illustrated conceptually. Drilling fluid or drilling "mud" is pumped down through the drill string 18 and through conduits in the TPS 12 and WCS 10, wherein the conduits are illustrated conceptually with the broken lines 11. Drilling mud exits the lower end of the WCS 10 and returns to the surface of the earth via the borehole 14. The flow of the drilling mud is illustrated conceptually by the arrows 15.

Still referring to FIG. 1, elements in the TPS 12 communicate with an uphole telemetry unit 24, as illustrated conceptually with the line 22. This link can include, but is not limited to, a mud-pulse telemetry system, an acoustic telemetry system or an electromagnetic telemetry system. Downhole measurements are received by the uphole telemetry unit 24 and processed as required in a processor 26 to obtain a measure of a parameter of interest. The parameter of interest is recorded by a suitable electronic or "hard-copy" recording device 28, and preferably displayed as a function of depth at which it was measured as a log 30.

FIG. 2a is a more detailed view of the WCS 10 and the TPS 12. A wireline tool 40 is shown deployed within the mud flow conduit illustrated by the broken lines 11. In the context of this disclosure, the term "wireline" tool includes tools operated with a wireline, tools operated with a slick line, and memory tools conveyed by drilling fluid or gravity.

Wireline logging systems have been used for decades, with the first system being operated in a borehole in the late 1920's. The tools typically vary in outside diameter from about 1.5 inches to over 4 inches. Lengths can vary from a few feet to 100 feet. Tool housings are typically fabricated to withstand pressures of over 10,000 pounds per square inch. Power is typically supplied from the surface of the earth via the wireline cable. Formation and borehole data, obtained by sensors in the downhole tool, can be telemetered to the surface for processing. Alternately, sensor data can be processed within the wireline tool, and "answers" telemetered to the surface. The patent literature abounds with wireline tool disclosures. U.S. Pat. Nos. 3,780,302, 4,424,444 and 4,002,904 disclose the basic apparatus and methods of a wireline logging system, and are entered herein by reference.

Again referring to FIG. 2a, the upper end of the wireline tool 40 is physically and electronically connected to an upper connector 42. The TPS 12 comprises a power supply 48 and a downhole telemetry unit 46. The power supply 48 supplies power to the wireline tool 40 through the connector 42, when configured as shown in FIG. 2a. The power supply 48 also provides power to the downhole telemetry unit 46, as illustrated by the functional arrow. The downhole telemetry unit 46 is operationally connected, through the upper connector 42, to the wireline tool 40 via the communication link represented conceptually by the line 52. The communication link 52 can be, but is not limited to, a hard-wire or alternately a "short-hop" electromagnetic communication link. As shown in FIG. 2a, a wireline tool can be conveyed into a well borehole 14 (see FIG. 1) using a tubular conveyance means such as a drill string 18. The WCS 10 tends to shield the wireline tool 40 from many of the harsh conditions encountered within the borehole 14. Furthermore, the tool 40 is in communication with the surface using the downhole and uphole telemetry units 46 and 24, respectively, over the communication link 22 which can be, but is not limited to, a mud pulse telemetry system, an acoustic telemetry system, or an electromagnetic telemetry system.

The outside diameter of the wireline tool 40 is preferably about 2.25 inches (5.72 centimeters) or less to fit within the conduit 11 of the WCS 10 and allow sufficient annular space for drilling fluid flow.

Once the desired depth is reached, the wireline tool 40 is deployed from the WCS 10. A signal is sent preferably from the surface via the telemetry link 22 physically releasing the tool 40 from the upper connector 42. Drilling fluid flow within the conduit 11 and represented by the arrow 15 pushes the tool 40 from the WCS 10 and into the borehole 14, as illustrated in FIG. 2b. If the tool 40 is a pad type tool, arms 60 are opened from the tool body deploying typically articulating pads against or near the formation 32. The deployed tool is physically and electrically connected to a lower connector 44, such as a wet connector. Electrical power is preferably supplied from the power supply 48 to the tool 40 by means of a wire 50 within the wall of the WCS 10. Alternately, power can be supplied by a coiled wire (not shown) extended inside the flow conduit (illustrated by the broken lines 11) from the upper connector 42 to the lower connector 44. Telemetric communication between the deployed tool 40 and the downhole telemetry unit 46 is preferably through the lower connector 44, and is illustrated conceptually with the line 54. Again, the communication link can include, but is not limited to, a hard wire or an electromagnetic short-hop system. Communication between the downhole telemetry unit 46 and the uphole telemetry unit 24 is again via the previously discussed link 22. Again, it should be understood that the wireline tool 40 can be a non-pad device.

Well logging methodology comprises initially positioning the conveyance system 100 into the borehole 12 at a predetermined depth, and preferably in conjunction with some other type if interim drilling operation such as a wiper trip. This initial positioning occurs with the wireline tool 40 contained within the WCS 10, as shown in FIG. 2a. At the predetermined depth and preferably on command from the surface, the wireline tool is released from the upper connector 42, forced out of the WCS 10 by the flowing drilling fluid (arrow 15), and retained by the lower connector 44. This tool-deployed configuration is shown in FIG. 2b. The system 100 is preferably conveyed upward within the borehole by the drill string 18, and one or more parameters of interest are measured as a function of depth thereby forming the desired log or logs 30 (see FIG. 1). If the wireline tool 40 is a formation testing tool, the system is stopped at a sample depth of interest, and a pressure sample or a fluid sample or both pressure and fluid samples are taken from the formation at that discrete depth. Alternately, formation pressure can be made, of formation pressure measurements and formation fluid sampled can both be acquired. The conveyance system 100 is subsequently moved and stopped at the next sample depth of interest, and the formation fluid sampling procedure is repeated.

The conveyance system 100 can be combined with an LWD/MWD system to enhance the performance of both technologies. As discussed previously, it is advantageous to use LWD/MWD technology to determine certain parameters of interest, and advantageous and sometimes necessary to use wireline technology to determine other parameters of interest. Certain types of LWD/MWD measurements are made most accurately during the drilling phase of the drilling operation. Other LWD/MWD measurements can be made with equal effectiveness during subsequent trips such as a wiper trip. As discussed previously, wireline conveyed logging can not be performed while drilling, and the conveyance system 100 can not be included in the drill string during actual drilling. Drilling LWD/MWD measurements and wireline conveyed measurements must, therefore, be made in separate runs. In order to accurately combine measurements made during two separate runs, the depths of each run must be accurately correlated over the entire logged interval.

Figure 3:
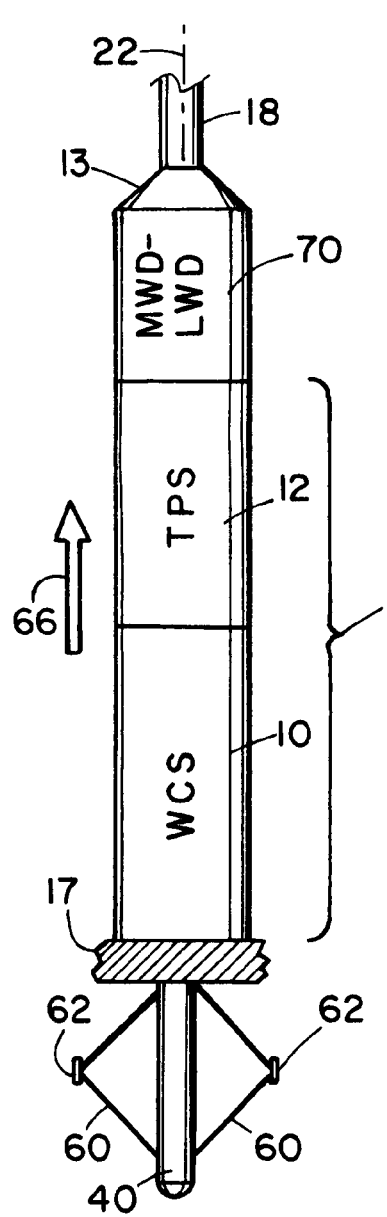
FIG. 3 shows a hybrid system with the wireline conveyance system combined with a LWD/MWD instrument, wherein the wireline tool is deployed in the borehole.

A hybrid tool comprising the wireline conveyance system 100 and a LWD/MWD subsection or "sub" 70 is shown in FIG. 3. As shown, the LWD/MWD sub 70 is operationally connected at the lower end to the TPS 12 and at the upper end to the connector head 13. The LWD/MWD sub 70 comprises one or more sensors (not shown). The hybrid tool is preferably used to depth correlate previously measured LWD/MWD data with measurements obtained with the wireline conveyance system 100.

Operation of the hybrid system shown in FIG. 3 is illustrated with an example. Assume that neutron porosity and gamma ray LWD/MWD logs have been run previously while drilling the borehole. After completion of the LWD/MWD or "first" run, the drill string is removed from the borehole and the drill bit and motor or rotary steerable is removed. The wireline conveyance system 100, comprising a gamma ray sensor and as an example a wireline formation tester, is added to the tool string below the LWD/MWD sub 70, as shown in FIG. 3. The tool string is lowered into the borehole, and the wireline tool 40 (comprising the gamma ray sensor and formation tester) is deployed as illustrated in FIG. 3. The tool string is moved up the borehole as indicated by the arrow 66 thereby forming a "second" run with the tools "sliding".

Both the wireline tool 40 and the LWD/MWD sub 70 measure gamma radiation as a function of depth thereby forming LWD/MWD and wireline gamma ray logs. It known in the art that multiple detectors are typically used in logging tools to form count rate ratios and thereby reduce the effects of the borehole. It is also known that additional borehole corrections, such as tool standoff corrections, are typically applied to these multiple detector logging tools. As an example, standoff corrections are applied to dual detector porosity and dual detector density systems. Standoff corrections for rotating dual detector tools typically differ from standoff corrections for wireline tools. The LWD/MWD neutron porosity measurement is preferably not repeated in the second run, since LWD/MWD borehole compensation techniques, including standoff, are typically based upon a rotating, rather than a sliding tool. Furthermore, washouts and drilling fluid invasion tends to be more prevalent during the second run. Stated another way, the neutron porosity measurement would typically be less accurate if measured during the second run, for reasons mentioned above.

The second run LWD/MWD gamma ray log may not show the exact magnitude of response as the "first run" LWD/MWD log, because factors discussed above in conjunction with the neutron log. Variations in the absolute readings tend to be less severe than for the neutron log. Furthermore, the second run gamma ray log shows the same depth correlatable bed boundary features as observed during the first run.

During the second run, the tool string is stopped at desired depths to allow multiple formation tests. Formation testing results, made with the wireline tool 40 during the second run, are then depth correlated with neutron porosity, made with the LWD/MWD sub 70 during the first run made while drilling, by using the gamma ray logs made during both runs as a means for depth correlation. All data are preferably telemetered to the surface via the telemetry link 22. Alternately, the data can be recorded and stored within the wireline tool for subsequent retrieval at the surface of the earth.

Figure 4A:
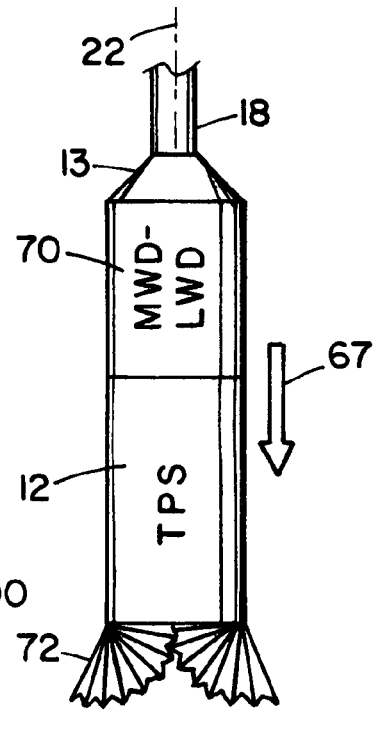
FIG. 4a shows a LWD/MWD subassembly combined with a telemetry and power subsection of the borehole conveyance system to form a LWD/MWD system for measuring parameters of interest while advancing the borehole.

The conveyance system 100 can be combined with an LWD/MWD system to enhance the performance of both technologies using alternate configurations and methodology. FIG. 4a shows the LWD/MWD sub 70 operationally connected to the TPS sub 12, which is terminated at the lower end by a drill bit 72. One or more LWD/MWD measurements are made as the drill string 18 rotates and advances the borehole downward as indicated by the arrow 67. This will again be referred to as the "first run".

Figure 4B:
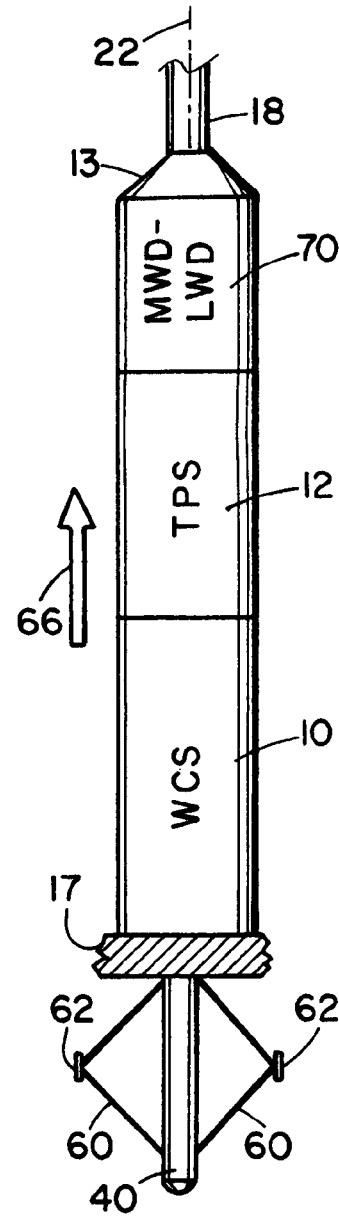
FIG. 4b shows a LWD/MWD subassembly combined with the wireline conveyance system such that the wireline tool and LWD/MWD sensors share a common power source and a common downhole telemetry unit.

During a second run of the drill string such as a wiper trip, the WCS 10 is added to the drill string along with a wiper 17, as shown in FIG. 4b. In this embodiment, the WCS 10 and LWD/MWD sub 70 share the same power supply 52 and downhole telemetry unit 46 (see FIGS. 2a and 2b) contained in the TPS 12. The tool is lowered to the desired depth, the wireline tool 40 is deployed as previously discussed, and the tool string in moved up the borehole (as indicated by the arrow 66) using the drill string 18 and cooperating connector head 13. One or more wireline tool measurements along with at least one LWD/MWD correlation log are measured during this second run. The at least one LWD/MWD correlation log allows all wireline and LWD/MWD logs to be accurately correlated for depth, and for other parameters such as borehole fluids, over the full extent of the logged interval. Again, all measured data are preferably telemetered to the surface via the telemetry link 22. Alternately, the data can be recorded and stored within the borehole tool for subsequent retrieval at the surface of the earth.

It should be noted that the step of running at least one LWD/MWD correlation log can be omitted, and only a wireline log using the tool 40 can be run if the particular logging operation does not require a LWD/MWD log, or does not require LWD/MWD log and wireline log depth correlation.

It should also be noted that the downhole element discussed previously can contain a downhole processor thereby allowing some or all sensor responses to be processed downhole, and the "answers" are telemetered to the surface via the telemetry link 22 in order to conserve bandwidth.

While the foregoing disclosure is directed toward the preferred embodiments of the invention, the scope of the invention is defined by the claims, which follow.

What is claimed is:

1. A drill string conveyed borehole system, the system comprising:
   (a) a tool string comprising
      (i) a LWD/MWD subsection,
      (ii) a telemetry-power subsection,
      (iii) a wireline carrier subsection operationally attached to said telemetry-power subsection; and
      (iv) a wireline tool; wherein
   (b) within said borehole, said wireline tool is deployed from said wireline carrier subsection;

(c) said tool string is conveyed along said borehole with said drill string not rotating thereby forming a second run;
(d) said LWD/MWD subsection measures at least one LWD/MWD log during said second run;
(e) said wireline tool measures at least one wireline log during said second run; and
(f) said at least one wireline log is correlated with a LWD/MWD log obtained in a previous run with said drill string rotating using said at least one LWD/MWD log obtained during said second run.

2. A method for borehole depth correlating a LWD/MWD log with a wireline log, the method comprising:
(a) providing a tool string comprising
(i) a LWD/MWD subsection,
(ii) a telemetry-power subsection,
(iii) a wireline carrier subsection operationally attached to said telemetry-power subsection; and
(iv) a wireline tool;
(b) within said borehole, deploying said wireline tool from said wireline carrier subsection;
(c) conveying said tool string along said borehole with said drill string not rotating thereby forming a second run;
(d) with said LWD/MWD subsection, measuring at least one LWD/MWD log during said second run;
(e) with said wireline tool, measuring at least one wireline log during said second run; and
(f) correlating said at least one wireline log with a LWD/MWD log obtained in a previous run with said drill string rotating using said at least one LWD/MWD log obtained during said second run.

3. A method for correlating a LWD/MWD log with a wireline log, the method comprising:
(a) providing a tool string operationally attached to a drill string, the tool string comprising
(i) a LWD/MWD subsection,
(ii) a telemetry-power subsection, and
(iii) a drill bit;
(b) measuring at least one LWD/MWD log during a first run with said drill string being rotated by said drill string thereby advancing a borehole by the action of said drill bit;
(c) removing said drill string and said tool string attached thereto from said borehole;
(d) removing said drill bit from said tool string and adding to said tool string a wireline carrier subsection operationally attached to said telemetry-power subsection, wherein said wireline carrier subsection contains a wireline tool therein;
(e) inserting said drill string and said attached tool string into said borehole and conveying said tool string to a predetermined depth;
(f) deploying said wireline tool from said wireline carrier subsection at said predetermined depth;
(g) conveying said tool string upward along said borehole with said drill string not rotating thereby forming a second run;
(h) with said LWD/MWD subsection, measuring at least one LWD/MWD log during said second run;
(i) with said wireline tool, measuring at least one wireline log during said second run; and
(j) correlating said at least one wireline log with a LWD/MWD log obtained in a previous run with said drill string rotating using said at least one LWD/MWD log obtained during said second run.

4. A method for logging earth formations, comprising the steps of:
(a) deriving a measurement of said earth formations while drilling a borehole using a logging-while-drilling measurement system conveyed into said borehole in a drill string; and
(b) deriving a second measurement of said earth formations while tripping in said borehole using a wireline measurement system conveyed into said borehole in said drill string; wherein
(c) said wireline measurement system is conveyed into said borehole in a wireline carrier section in a drill collar in said drill string; and
(d) wherein said wireline measurement system is deployed out of said wireline carrier section to derive said second measurement.

5. A method for logging earth formations, comprising the steps of:
(a) deriving first and second measurements of said earth formations while drilling a borehole using a logging-while-drilling measurement system conveyed into said borehole in a drill string; and
(b) deriving third and fourth measurements of said earth formations while tripping in said borehole using a wireline measurement system conveyed into said borehole in said drill string; wherein
(i) said wireline measurement system is conveyed into said borehole in a wireline carrier section in a drill collar in said drill string, and
(ii) said wireline measurement system is deployed out of said wireline carrier section to derive said third and fourth measurements;
(c) depth correlating said first and third measurements using said second and fourth measurements; and
(d) determining a parameter of said earth formations by combining said first and third measurements.

6. The method of claim 5 wherein said second and fourth measurements are measures of gamma radiation.

7. A method for logging a borehole penetrating earth formations, comprising the steps of:
(a) deriving a first measurement of borehole environs while drilling said borehole using a LWD/MWD measurement system conveyed into said borehole in a drill string; and
(b) deriving second and third measurements of said borehole environs while tripping in said borehole using a wireline measurement system conveyed into said borehole in said drill string; wherein
(i) said wireline measurement system is conveyed into said borehole in a wireline carrier section in a drill collar in said drill string, and
(ii) said wireline measurement system is deployed out of said wireline carrier section to derive said second and third measurements;
(c) determining a depth correlation by depth correlating said first and second measurements; and
(d) using said depth correlation, determining a parameter of said borehole environs from said third measurement with respect to depth measured by said LWD/MWD system.

8. The method of claim 7 wherein said first and second measurements comprise measures of gamma radiation.

9. The method of claim 7 wherein said third measurement comprises pressures of said formations.

10. The method of claim 7 wherein said third measurements comprises images of a wall of said borehole.

11. A method for logging a borehole penetrating earth formations, comprising:
(a) providing a tool string comprising
(i) a LWD/MWD subsection, (ii) a telemetry-power subsection,
(iii) a wireline carrier subsection operationally attached to said telemetry-power subsection; and
(iv) a wireline tool;
(b) with said LWD/MWD subsection, measuring at least one LWD/MWD log during a first run;
(c) during a second run, deploying said wireline tool from said wireline carrier subsection;
(d) conveying said tool string along said borehole with said drill string not rotating thereby forming a second run;
(e) with said wireline tool, measuring at least one wireline log during said second run; and
(f) correlating said at least one wireline log with a LWD/MWD log obtained in a previous run with said drill string rotating using said at least one LWD/MWD log obtained during said second run.

* * * * *